United States Patent [19]

Koening et al.

[11] Patent Number: 4,714,483
[45] Date of Patent: Dec. 22, 1987

[54] AIR DRYER PURGE CONTROL FOR TURBOCHARGED COMPRESSORS

[75] Inventors: James P. Koening, Olmsted Township, Cuyahoga County; David J. Knight, Avon Lake; James E. Szudy, Parma; Roy E. Bartholomew; William R. Wurst, both of Elyria, all of Ohio

[73] Assignee: Allied Corporation, Morristown, N.J.

[21] Appl. No.: 873,899

[22] Filed: Jun. 13, 1986

[51] Int. Cl.[4] .............................................. B01D 53/04
[52] U.S. Cl. ........................................ 55/163; 55/387; 55/DIG. 17
[58] Field of Search .......... 55/163, 316, 387, DIG. 17

[56] References Cited

U.S. PATENT DOCUMENTS

| | | |
|---|---|---|
| 3,182,435 | 5/1965 | Axt ................................. 55/DIG. 17 |
| 3,279,151 | 10/1966 | Kauer, Jr. et al. ................ 55/163 X |
| 3,464,186 | 9/1969 | Hankison et al. ...................... 55/163 |
| 3,472,000 | 10/1969 | Glass et al. ............................ 55/163 |
| 3,714,763 | 2/1973 | Suzuki .................................... 55/163 |
| 3,778,967 | 12/1973 | Kauer, Jr. et al. ................ 55/163 X |
| 3,923,479 | 12/1975 | Glass et al. ............................ 55/163 |
| 3,937,622 | 2/1976 | Hewitt et al. .......................... 55/163 |
| 4,052,178 | 10/1977 | Frantz ......................... 55/DIG. 17 |
| 4,487,617 | 12/1984 | Dienes et al. ................. 55/DIG. 17 |
| 4,549,888 | 10/1985 | Fannin ................................... 55/163 |

Primary Examiner—Robert Spitzer
Attorney, Agent, or Firm—Ken C. Decker; William N. Antonis

[57] ABSTRACT

A compressed air system includes an air compressor the inlet of which is communicated to the vehicle engine turbocharger. The outlet of the air compressor is communicated through an air dryer to a storage reservoir. A governor is responsive to the pressure level in the reservoir to generate an unloading signal unloading the air compressor when the pressure in the reservoir attains a predetermined value. The unloading signal is also communicated through a control valve to purge the air dryer during compressor unloading. The control valve closes communication between the governor and the air dryer to trap a predetermined pressure level in the purge volume of the air dryer to prevent the air dryer from purging to atmospheric pressure. Accordingly, a predetermined air pressure level is maintained in the purge volume, so that the outlet of the turbocharger can never be communicated to atmospheric pressure.

14 Claims, 5 Drawing Figures

AIR DRYER PURGE CONTROL FOR TURBOCHARGED COMPRESSORS

This invention relates to a compressed air control system for and automatic vehicle having a turbocharged engine.

Heavy duty vehicles are normally equipped with compressed air braking systems. Since moisture in the compressed air used to operate the braking system is detrimental, it has become increasingly common that such vehicles are also equipped with air dryers, which usually contain a desiccant that dries the air communicated through the air dryer before it is communicated to storage reservoirs. The air compressor used to compress the air is unloaded by a governor which is responsive to the pressure level in the storage reservoirs to generate an unloading signal when the pressure in the reservoirs attains a predetermined level. This unloading signal is also communicated to the air dryer, which causes the latter to back-flush or purge the desiccant during compressor unloading.

Furthermore, vehicles equipped with air brakes are normally also equipped with diesel engines, which are commonly turbocharged. The inlet air to the air compressor is often connected to the outlet of the turbocharger. However, when the compressor is unloaded and the air dryer is being purged, the outlet of the turbocharger is communicated to atmosphere when the pressure generated by the turbocharger is greater than the pressure at the discharge valve of the compressor and if the compressor is still unloaded after the air dryer finishes purging. This fact has obvious detrimental consequences, including loss of engine power, increased fuel consumption and an increase in engine emissions. A solution proposed to this problem heretofore is to place a pressure protection valve in the discharge line between the air compressor and the air dryer. However, industry practice discourages use of restrictive valves in the discharge line from the air compressor. Even if such valves were used, they do provide a restriction in the discharge line, and failure of the valve could also fail the air brake system. Accordingly, an advangtage of the present invention is that the outlet of the turbocharger is protected from being communicated to atmosphere, without placing a restrictive valve in the discharge line of the air compressor.

This and other advantages of the invention will become apparent from the following description, with reference to the accompanying drawings, in which.

Figure 1:
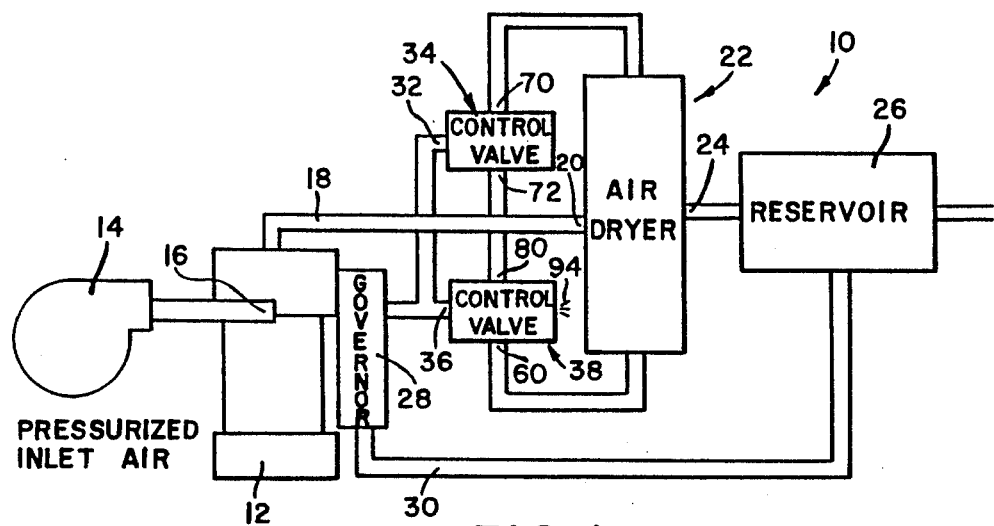
FIG. 1 is a schematic illustration of a portion of a compressed air system made pursuant to the teachings of the present invention.

Referring now to the drawings, a compressed air system generally indicated by the numeral 10 includes a conventional automotive air compressor 12 which is powered by the engine of the vehicle. The vehicle further includes a conventional turbocharger 14 which compresses air communicated to the inlet manifold of the engine to increase engine power. The turbocharger 14 is powered by exhaust gases generated by the vehicle engine. The outlet of turbocharger 14 is also communicated to the inlet 16 of the air compressor 12. The compressor 12 compresses the air from the turbocharger 14 and communicates compressed air through discharge line 18 to inlet port 20 of air dryer 22. When the compressor 12 is operating, air communicates through outlet or delivery port 24 of the air dryer 22, to a conventional storage reservoir 26. A governor 28 is responsive to the pressure in reservoir 26 which is communicated to the governor 28 through line 30. When the pressure in reservoir 26 attains a predetermined level, the governor 28 generates an unloading signal which unloads or disables the compressor 12. The unloading signal is also communicated to control port 32 of a control valve 34 and into supply or inlet port 36 of a control valve 38.

Figure 3:
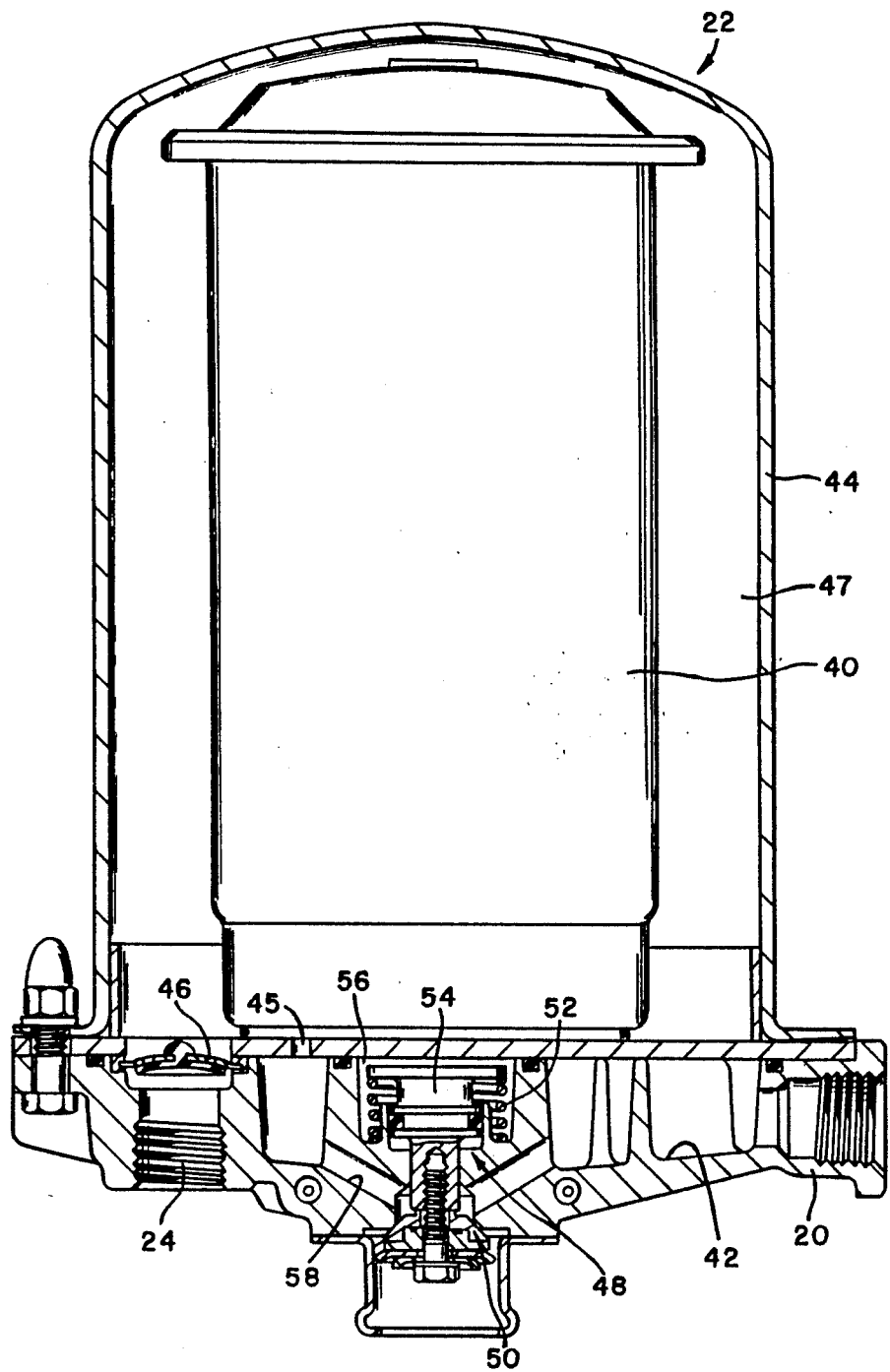
FIG. 3 is a view, partly in section, of the air dryer used in the systems of FIGS. 1 and 2.

Referring now to FIG. 3, the supply or inlet port 20 of air dryer 22 is communicated to a desiccant canister 40 through a passage 42 and apertures 45. Compressed air flows upwardly through the desiccant canister 40, where the moisture is removed from the air by desiccant pellets contained within the canister 40, in a manner well known to those skilled in the art. Air is communicated from the desiccant canister 40 into a purge volume 47 which is defined between the desiccant canister 40 and the outer wall 44 of the air dtyer housing. Compressed air is communicated from the purge volume 47 to the outlet port 24 through a one-way check valve 46. Accordingly, compressed air is permitted to flow from the purge volume 47 into the reservoir 26 through the outlet or delivery port 24, but communication in the reverse direction is prevented by check valve 46. Accordingly, the purge volume 47 contains a predetermined quantity of segregated air that is used to purge the desiccant canister 40 when the compressor is unloaded, as will be described in detail hereinafter. The air dryer 22 may be made pursuant to the teachings of U.S. Pat. No. 4,487,617.

Purging of the desiccant canister 40 is controlled by a purge valve generally indicated by the numeral 48. Purge valve 48 includes a valve element 50 which is normally urged against a corresponding valve seat on the housing by a spring 52 acting against a piston 54 which is integral with the valve element 50. Spring 52 urges piston 54, and the valve element 50, upwardly viewing FIG. 3, thereby causing the valve element 50 to sealingly engage its valve seat. However, piston 54 is responsive to the fluid pressure level in chamber 56 to be forced downwardly against the bias of spring 52, thereby opening the valve element 50 and permitting air in purge volume 47 to back-flow through the desiccant container 40 and the apertures 45 into passages 58 and from the passages 58 to atmosphere through open purge valve 48. Purging is controlled by a pressure signal which is communicated into the chamber 56 from delivery port 60 of control valve 38, as will be described in detail hereinafter. As can be seen from FIG. 3, when the purge valve 48 is forced downwardly to vent the desiccant canister 40 and purge volume 47 to . atmosphere, the inlet or supply port 20 is also communicated to atmosphere through the passages 42 and 58. Accordingly, at the completion of purging, the supply or inlet port 20 is communicated to atmosphere for the duration of the compressor unloading cycle. Since the inlet or supply port 20 is connected to the outlet of the turbocharger 14 through the air compressor 12, the outlet of the turbocharger 14 will also be communicated to atmospheric pressure. This, of course, has undesirable consequences as discussed hereinabove. However, according to the present invention, the pressure level at the outlet of turbocharger 14 can never be communicated to atmospheric pressure.

Figure 4:
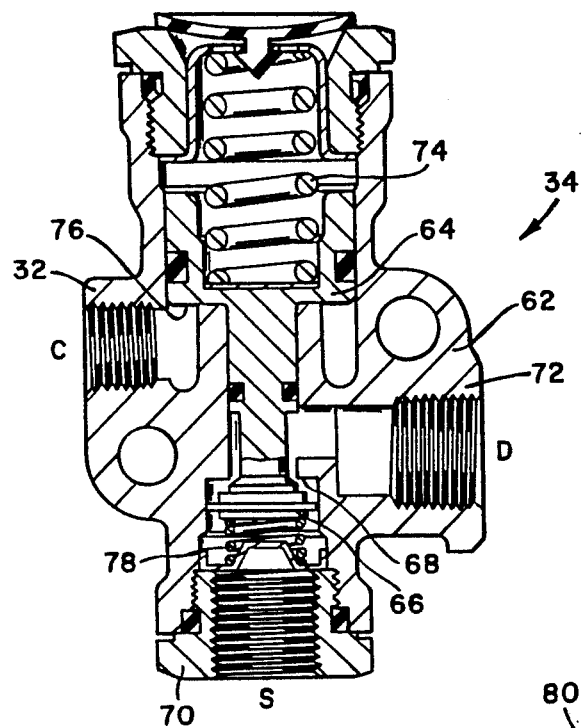
FIG. 4 is a longitudinal cross sectional view of a control valve used in the system of FIG. 1.

Referring to FIG. 4, the control valve 34 includes a housing 62 which slidably receives a piston assembly 64 therewithin. A valve element 66 is adapted to engage a valve seat 68 to control communication between an inlet or supply port 70 of the valve 34 and an oulet or delivery port 72 thereof. The piston assembly 64 controls the valve member 66, and the valve member 66 is normally urged away from the seat 68 because the spring 74 acts on the piston 64 to urge the piston assembly 64 against the valve element 66 and to thereafter urge the piston assembly 64 and valve element 66 downwardly viewing FIG. 3. The control port 32 of valve 34 commutes effective area 76 of piston assembly 64 to the control pressure at the outlet of the governor 28, so that when the pressure level of control port 32 attains a predetermined level, piston 64 is urged upwardly viewing the Figure, thereby permitting the valve member 66 to sealingly engage valve seat 68, to thereby terminate communication from the supply port 70 to the delivery port 72. However, since the valve member 66 is held against seat 68 by action of a spring 78, pressure can vent back from the delivery port 72 to the supply port 70 even when the valve member 66 is permitted to engage the valve seat 68 by upward movement of the piston assembly 64. The control port 32, as discussed hereinabove, is communicated to the unloader pressure signal generated by the governor 28 during compressor unloading. The delivery port 72 is communicated to the control port 80 of the valve 38, and the supply port 70 of valve 34 is communicated to the purge volume 47 of the air dryer 22, through an appropriate inlet fitting (not shown).

Figure 5:
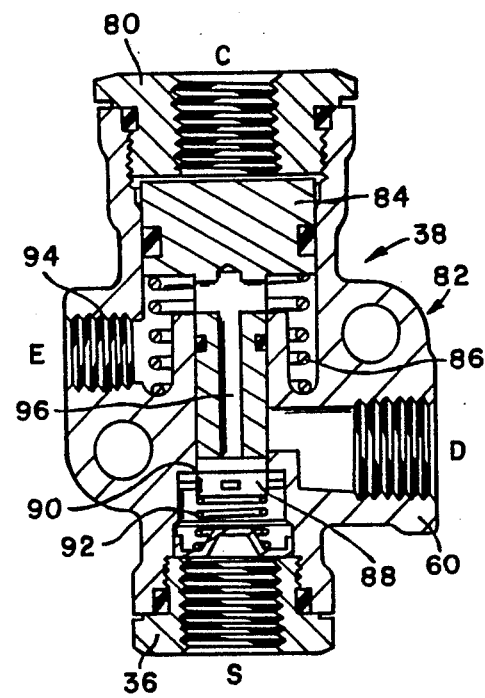
FIG. 5 is a longitudinal cross sectional view of another control valve used in the systems illustrated in FIGS. 1 and 2.

Control valve 38 includes a housing 82 which slidably receives a piston assembly 84 which is urged upwardly viewing FIG. 5 by a spring 86. The piston assembly 84 is responsive to the pressure level at control port 80 to move downwardly viewing the Figure. A valve element 88 is yieldably urged into sealing engagement with a valve seat 90 by a spring 92. Accordingly, when the pressure at control port 80 is relatively low, the spring 86 urges the piston assembly 84 to the position illustrated in the drawings, thereby permitting the valve member 88 to sealingly engage valve seat 90 to terminate communication from supply port 36 to delivery port 60 while venting delivery port 60 to exhaust port 94 through passages 96 within the piston assembly 84. When pressure at control port 80 exceeds the predetermined value sufficient to overcome spring 86, piston assembly 84 moves downwardly, to engage the valve element 88 to thereby close the passage 96 and terminate communication between delivery port 60 and exhaust port 94. Thereafter, the valve member 88 is urged away from valve seat 90, thereby permitting communication from supply port 36 to delivery port 60. As discussed hereinabove, control port 80 is communicated to delivery port 72 of valve 34, delivery port 60 is communicated to the chamber 56 to operate the purge valve 48 of the air dryer 22, and the supply port 36 is communicated to the unloader signal generated by governor 28.

In operation, normal operation of the air compressor 12 generates pressure which is communicated through discharge line 18 to the supply reservoir 26 through the air dryer 22 When the pressure in reservoir 26 attains a predetermined level, the governor 28 generates an unloading signal, which unloads the air compressor 12 and which is also communicated to control port 32 of the valve 34 and to supply port 36 of the valve 38. The governor 28 is conventional, and is well known to those skilled in the art.

As the reservoir 26 is charged, the pressure level in purge volume 47 increases as the pressure in reservoir 26 increases. This pressure is fed to the control port 80 of valve 38 through the open control valve 34, since the spring 74 urges the valve member 66 to a position permitting communication between the supply and delivery ports of the valve 34. However, even though the valve 38 opens communication between supply port 36 and delivery port 60 due to the high pressure at control port 80, no pressure signal is communicated to the purge valve 48, since the governor is not yet generating an unloading signal. When the governor 28 generates the aforementioned unloading signal, a pressure signal is communicated to control port 32 of valve 34, thereby urging the piston assembly 64 upwardly viewing FIG. 4 to permit the valve member 66 to close against valve member 68, thereby cutting off communication from the supply port 70 to the delivery port 72. Accordingly, the pressure at control port 80 of valve 38 is momentarily trapped by closure of the valve 34, but as the pressure in purge volume 47 decreases during the purge cycle, the pressure at control port 80 bleeds back through the control valve 34, since the decreasing pressure at supply port 70 communicated to the purge volume 47 causes the higher pressure level at delivery port 72 to force the valve member 66 open against the force of spring 78.

As long as the pressure at control port 80 of valve 38 is sufficient to overcome the spring 86, a pressure signal from the governor 28 is communicated through the valve 38 to the purge valve 48 of the air dryer 22, causing the purge valve 48 to open. When the pressure bleeding back from the control port 80 of valve 38 reaches a predetermined level such that the spring 86 urges piston 84 upwardly viewing the Figure, the valve member 88 is urged into sealing engagement with valve seat 90 by spring 92, and the delivery port 60 is open to exhaust port 94 through the passages 96. Accordingly, when this predetermined pressure level is attained, the pressure in chamber 56 is vented, causing the purge valve 48 to close. The valve 38 is designed such that the pressure level at control port 80 at which the spring 86 moves the piston assembly 84 back into the position illustrated on the drawing is somewhat above atmospheric pressure, and approximates the pressure level at the outlet of turbocharger 14. Accordingly, a pressure level somewhat higher than atmospheric pressure is trapped in the purge volume 47 at the conclusion of purging, so that the supply port 20 is never communicated to atmospheric pressure.

Figure 2:
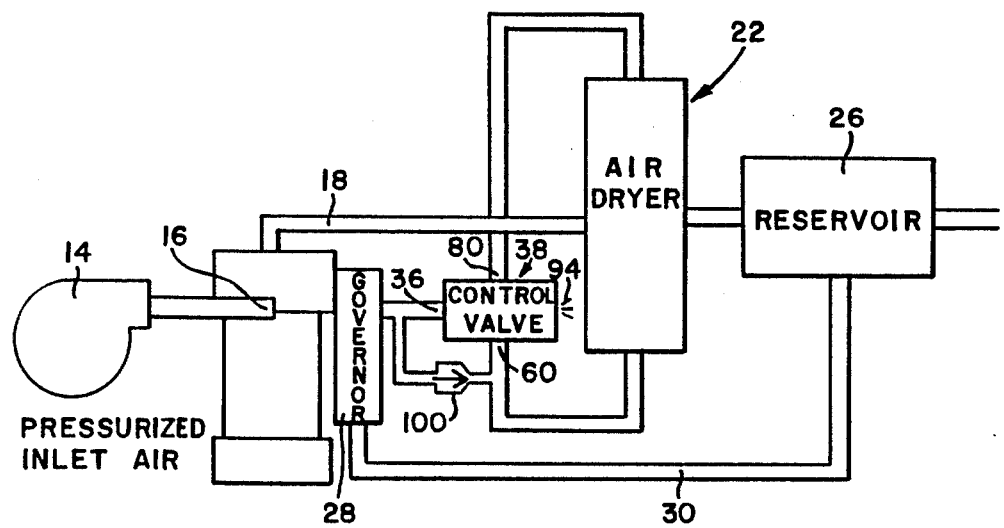
FIG. 2 is a schematic similar to FIG. 1 but illustrating a different embodiment of the invention.

The alternate embodiment of FIG. 2 is substantially the same as that of FIG. 1, except that the control valve 34 has been eliminated and the control port 80 of the valve 38 is communicated directly to the purge volume 47 of the air dryer 22. A check valve 100 has been added to assure that the pressure signal controlling purge valve 48 is vented around the control valve 38 at the determination of the governor unloading signal. Accordingly, when the pressure in the purge volume 47 attains the pressure level sufficient to open the valve 38 by forcing piston 84 downwardly while the reservoir 26 is being charged, the valve 38 opens to permit communication between the supply port 36 and delivery port 60 thereof, but since there is no signal from the governor, the purge of valve 48 remains closed. However, when a governor unloading signal is generated, this signal is communicated through the valve 38 from the supply port 36 to delivery port 60 thereof, since the pressure control port 80 has opened the valve 38, causing the air dryer to purge. As the air dryer purges, pressure at control port 80 of valve 38 decreases. When pressure at port 80 decreases to a predetermined level, spring 86 pushes piston 84 upwardly to allow valve 88 to engage seat 90. The pressure at port 60 is then exhausted until the purge valve 48 closes. This will occur at a pressure level above atmospheric and before loss of boost pressure from the turbocharger.

We claim:

1. Compressed air system comprising a reservoir, an air compressor having a discharge line communicated to the reservoir for charging the latter to a predetermined pressure level, an air dryer in said discharge line for drying compressed air communicated to the reservoir, means for segregating from said reservoir a segregated air volume, said air dryer including a purgable desiccant and being responsive to a pressure signal to regenerate said desiccant by communicating said segregated air volume through the desiccant in a direction opposite to the direction air is communicated through the desiccant when the reservoir is charged, a governor responsive to the pressure level in the reservoir to unload the air compressor and generate said pressure signal when the pressure level in the reservoir attains said predetermined level, and valve means between said governor and said air dryer and responsive to the pressure level in said segregated air volume and to said pressure signal to control communication of the pressure signal to the air dryer whereby said pressure signal is terminated when the pressure level of said segregated air volume drops below a predetermined level.

2. Compressed air system as claimed in claim 1, wherein said air dry includes a purge valve responsive to said pressure signal for communicating said segregated air volume through said desiccant in said opposite direction, said valve means including means responsive to the pressure level in said segregated air volume to shift from a first condition communicating the purge valve with the governor to a second condition terminating communication between the governor and the purge valve and simultaneously venting said purge valve.

3. Compressed air system as claimed in claim 2, wherein said valve means includes a first valve mechanism connected between the purge valve and the governor and second valve mechanism for controlling said first valve mechanism to shift the latter between said first and second conditions, said second valve mechanism being responsive to the pressure level in said segregated air volume to generate a control signal shifting said first valve mechanism between said first and second conditions.

4. Compressed air system as claimed in claim 3, wherein said first valve mechanism includes an inlet port communicated with the governor, an outlet port communicated with the purge valve, a control port communicated to said second valve mechanism, and an exhaust port communicated to atmosphere, said means responsive to the pressure level in said segregated air volume including valve components in said first valve mechanism responsive to the pressure level at said control port for controlling communication between said inlet port, said outlet port, and said exhaust port.

5. Compressed air system as claimed in claim 4, wherein said second valve mechanism includes an inlet port communicated to said segregated air volume, an outlet port communicated to the control port of the second valve mechanism, a control port communicated with said pressure signal, and valve structure responsive to the pressure level at said control port to control communication between the inlet and outlet ports.

6. Compressed air system as claimed in claim 5, wherein said inlet and outlet ports of said second valve mechanism are communicated with one another in the absence of said pressure signal, said valve structure being responsive to said pressure signal to terminate communication between the inlet and outlet ports of said second valve mechanism to trap a pressure level at the control port of said first valve mechanism.

7. Compressed air system as claimed in claim 2, wherein said valve means includes valve mechanism having an exhaust port, an inlet port communicated to said governor, an outlet port communicated to said purge valve, a control port communicated to said segregated air volume, and valve structure responsive to the pressure level at said control port to shift from said first condition in which the inlet and outlet ports are communicated with one another and the exhaust port is closed when the pressure level at said control port exceeds a predetermined level to said second condition when the pressure level at the control port drops below said predetermined pressure level to terminate communication between the inlet and outlet ports and to vent said outlet port to said exhaust port.

8. Compressed air system as claimed in claim 7, wherein said control port is communicated directly with said segregated air volume.

9. Compressed air system as claimed in claim 7, wherein a control valve is communicated between said control port and said segregated air volume, said control valve being responsive to the pressure signal to shift from a first condition venting said control port to a second condition communicating said control port to said segregated air volume.

10. Compressed air system comprising a reservoir, an air compressor communicated to said reservoir for charging the latter to a predetermined pressure level and an air dryer connected between the air compressor and the reservoir for drying compressed air communicated to the reservoir, said air dryer including means for segregating a segregated air volume separate from said reservoir for purging the air dryer when the compressor is unloaded, a governor responsive to said predetermined pressure level for unloading said air compressor and for generating a pressure signal causing said segregated air volume to purge said air compressor, and valve means responsive to the pressure level of said segregated air volume for terminating purging of the air dryer when the pressure level in said segregated air volume drops below a predecided pressure level.

11. Compressed air system as claimed in claim 1, wherein said valve means includes inlet and outlet ports through which said pressure signal is communicated and an exhaust port, said valve means including valve structure responsive to the pressure level in said segregated air volume for terminating communication between said inlet and outlet ports and venting said outlet port to said exhaust port.

12. Compressed air system as claimed in claim 11, wherein said valve means includes a control port, said valve structure being responsive to a pressure change at said control port to initiate said termination of communication between the inlet and outlet ports and said venting of the outlet port to the exhaust port.

13. Compressed air system as claimed in claim 12, wherein said control port is directly communicated to said segregated air volume.

14. Compressed air system as claimed in claim 12, wherein said control port is communicated to said segregated air volume through another valve means, said another valve means being responsive to said pressure signal to control communication between said segregated air volume and said control port.

* * * * *